Feb. 27, 1934.  F. LYONS ET AL  1,948,624
DECOY
Filed Feb. 1, 1932
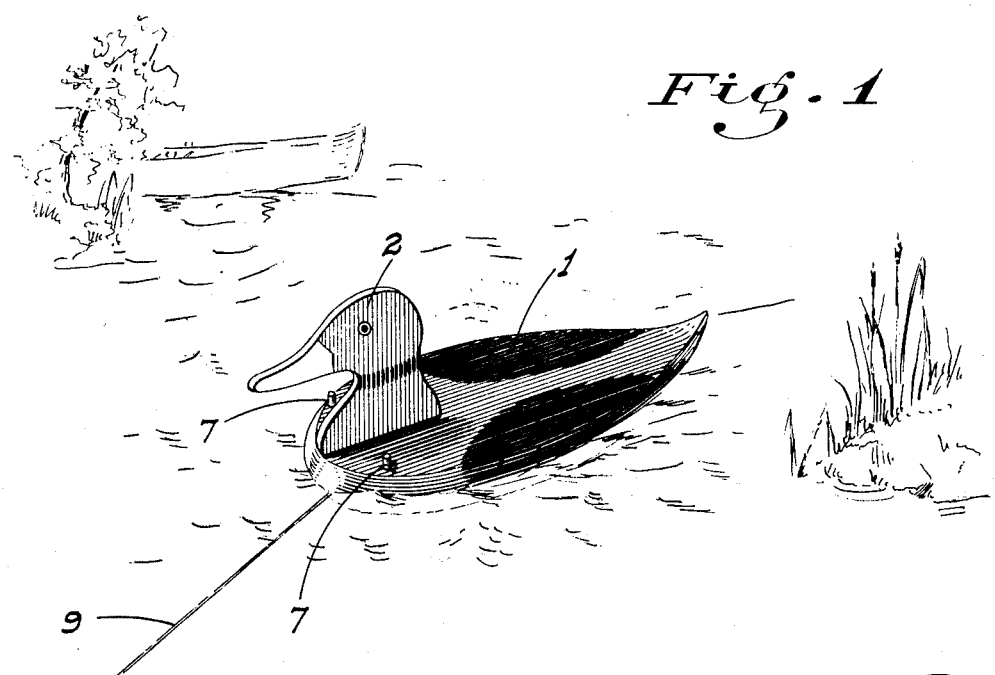
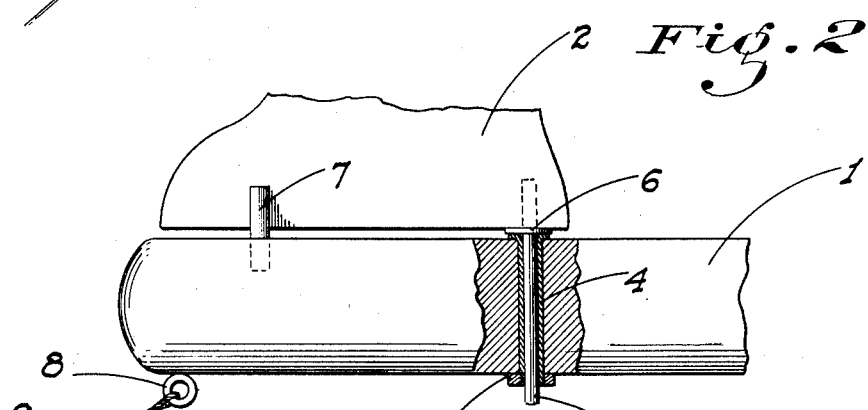
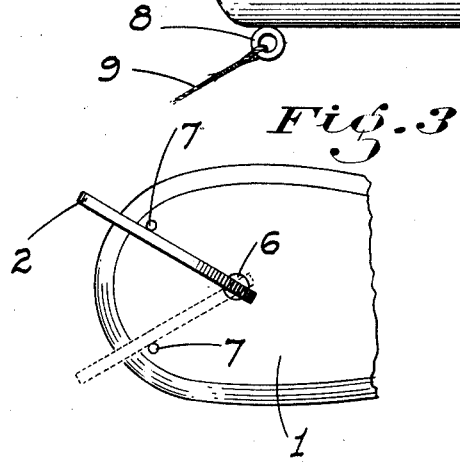
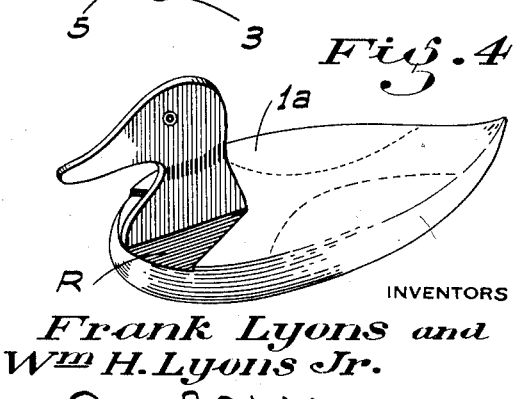
INVENTORS
*Frank Lyons* and
*W^m H. Lyons Jr.*
BY _____ ATTORNEY

UNITED STATES PATENT OFFICE 1,948,624

DECOY

Frank Lyons and William H. Lyons, Jr., Lodi, Calif.

Application February 1, 1932. Serial No. 590,019

1 Claim. (Cl. 43—3)

This invention relates to decoys for ducks, geese or other water fowl and particularly to decoys of a nature used by hunters on ponds, sloughs and the like to attract the wild fowl.

The principal object of our invention is to provide a decoy that will float upon the surface of the water and slowly turn from one direction to another in such a manner as to simulate the swimming action of a live duck etc. A decoy is thus provided that will, by movement of the various parts, increase the deceptive character of the decoy and enhance the probability of decoying wild fowl.

A further object of our invention is to provide a decoy that is exceedingly light in weight and whose parts are easily and rapidly assembled or taken apart for transportation purposes, and in which such parts, when taken apart, can be packed in a very flat and compact arrangement. A large number of decoys can thus be carried to the blind etc. with a minimum of inconvenience to the hunter.

These objects we accomplish by means of such structure and relative arrangement of parts as will fully appear by a perusal of the following specification and claim.

In the drawing similar characters of reference indicate corresponding parts in the several views:

Fig. 1 is the decoy in perspective showing the method of operation and appearance in actual use.

Fig. 2 is a fragmentary side view of the decoy partially broken out showing the mounting of the head.

Fig. 3 is a fragmentary top plan view of the decoy showing the operation of the head.

Fig. 4 is a fragmentary perspective showing a modified movement-limiting arrangement for the head.

Referring now more particularly to the characters of reference on the drawing, the numeral 1 denotes the body of the decoy shaped around the edges in the present instance to simulate a duck. The top and bottom of the body are substantially flat and are colored to appear as a live bird when seen from the air. Mounted in its natural position is the head 2. This head is a thin flat member cut to resemble a bird's head. Both the body 1 and the head 2 are constructed of exceedingly light material, preferably Balsa wood which floats readily.

Connecting the head with the body is a circular pin 3 mounted permanently by any suitable means in the head 2. This pin extends through a flange bushing 4 which is placed vertically through the body 1 and held in position by a nut 5. The pin has an easy running fit in the bushing in order to allow the head great freedom of movement from side to side but on a horizontal plane.

The pin 3 passes through the bushing and extends a short distance beyond in order to provide space for a cotter pin if necessary. On the pin 3 and disposed between the head 2 and the top flange of the bushing is a non-removable washer 6. This washer keeps the head 2 above and parallel to the body 1. This spacing between the body and the head is necessary to provide for the aforementioned freedom of movement.

Pins 7 are symmetrically placed in the body to each side and forward of the pivotal pin 3 in the head. These pins 7 are of sufficient height to act as stops for the free moving head 2 and are spaced to provide approximately 60° of movement of the head.

Instead of the pins, the body 1a may be provided on top with an arcuate recess R in which the lower edge of the head projects and whose sides limit the swinging of the head. In this manner, nothing projects above the body when the head is removed to interfere with the close stacking of a number of the bodies.

A ring 8 is centrally mounted on the extreme forward under surface of the body 1. To this ring is attached a cord 9 or other anchoring means as usual.

By reason of this arrangement of the several parts the decoy in operation is at all times facing into the wind because of the positioning of the ring and anchor means.

As the decoy faces the wind the head which also faces at its free end into the wind is turned by the breeze in one direction or the other until it reaches a stop pin etc. Upon reaching said stop an air pressure upon the head exerts a like pressure on the body. This pressure turns the body partially across the air stream and the body begins to swing about the anchor as an axis.

When the decoy has been swung so far in one direction that the pivoted end of the head moves beyond the direct line of the wind, the head is suddenly shifted by the wind action to the opposite stop. This movement imparts a lateral wiggling movement to the decoy, and it swings in the opposite direction.

The opposed movements taking place in rapid succession, the peculiar wiggling or swinging movement of a duck when swimming is imparted to the decoy.

The head being flat catches and holds the wind and exerts a better force or turning pressure on the body than would a rounded head. The head being pivoted at one end practically the entire area of the head is utilized to impart movement to the body. A continuous oscillation or swinging movement of the decoy on the water and which simulates the swimming action of a duck is therefore had and this movement together with the intermittent head movements imparts a life-like appearance to the decoy and is of untold advantage in attracting wild fowl.

It will be noted that the bushing and the head pin project entirely through the body. This not only provides a long bearing area for the pin which insures its freedom of turning but also makes it unnecessary to employ a holding means for the pin to prevent the same from possibly dropping out when in operation.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

A decoy comprising a body, a head separate therefrom, a pivot between the body and head toward the rear end of the latter; the top surface of the body having a recess into which the base of the head in front of the pivot depends, the side edges of the recess being disposed to limit the turning of the head to an arc of predetermined degree.

FRANK LYONS.
WILLIAM H. LYONS, Jr.